(12) United States Patent
Ansari et al.

(10) Patent No.: US 7,007,121 B1
(45) Date of Patent: Feb. 28, 2006

(54) METHOD AND APPARATUS FOR SYNCHRONIZED BUSES

(75) Inventors: Ahmad R. Ansari, San Jose, CA (US); Mehul R. Vashi, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 544 days.

(21) Appl. No.: 10/084,569

(22) Filed: Feb. 27, 2002

(51) Int. Cl.
G06F 13/362 (2006.01)
G06F 1/08 (2006.01)
G06F 5/06 (2006.01)

(52) U.S. Cl. .................. 710/113; 713/501; 713/600
(58) Field of Classification Search ........... 710/113; 709/233; 713/501, 600; 370/468
See application file for complete search history.

(56) References Cited

U.S. PATENT DOCUMENTS

| | | | |
|---|---|---|---|
| 3,708,686 A | * | 1/1973 | Butler et al. ........... 307/149 |
| 4,414,624 A | * | 11/1983 | Summer et al. ........... 712/21 |
| 4,758,985 A | | 7/1988 | Carter |
| 4,855,669 A | | 8/1989 | Mahoney |
| 5,072,418 A | | 12/1991 | Boutaud et al. |
| 5,131,085 A | * | 7/1992 | Eikill et al. ........... 710/110 |
| 5,142,625 A | | 8/1992 | Nakai |
| RE34,363 E | | 8/1993 | Freeman |
| 5,274,570 A | | 12/1993 | Izumi et al. |
| 5,311,114 A | | 5/1994 | Sambamurthy et al. |
| 5,339,262 A | | 8/1994 | Rostoker et al. |
| 5,347,181 A | | 9/1994 | Ashby et al. |
| 5,361,373 A | | 11/1994 | Gilson |
| 5,457,410 A | | 10/1995 | Ting |
| 5,473,267 A | | 12/1995 | Stansfield |
| 5,500,943 A | | 3/1996 | Ho et al. |
| 5,504,738 A | | 4/1996 | Sambamurthy et al. |
| 5,537,601 A | | 7/1996 | Kimura et al. |
| 5,543,640 A | | 8/1996 | Sutherland et al. |
| 5,550,782 A | | 8/1996 | Cliff et al. |

(Continued)

FOREIGN PATENT DOCUMENTS

EP 0315275 A2 10/1989

(Continued)

OTHER PUBLICATIONS

Cary D. Snyder and Max Baron; "Xilinx's A-to-Z System Platform"; Cahners Microprocessor; The Insider's Guide to Microprocessor Hardware; Microdesign Resources; Feb. 6, 2001; pp. 1-5.

(Continued)

*Primary Examiner*—Rehana Perveen
*Assistant Examiner*—Jeremy S. Cerullo
(74) *Attorney, Agent, or Firm*—James Harrison (57) ABSTRACT

A bus arbiter controls the bus frequency in a system that includes a plurality of bus masters and a plurality of slaves. The bus frequency is determined according to the internal frequency of the devices that are part of the transaction. Additionally, the bus frequency is set according to the length of the bus between the devices that are a part of the transaction and, correspondingly, the expected amount of impedance there between. As a part of the present invention, a master seeking bus resources to initiate a transaction generates a bus request and a destination address to the bus arbiter so that it may determine a corresponding bus frequency in advance. Thereafter, the bus arbiter sets the bus frequency to a value that corresponds to the transaction that is about to take place thereon. Next, the bus arbiter issues a grant signal to enable the master to use the bus. Each slave device for a transaction then generates or receives sample cycle signals indicating when a signal should be read on the bus.

26 Claims, 6 Drawing Sheets

U.S. PATENT DOCUMENTS

| | | | |
|---|---|---|---|
| 5,552,722 A | 9/1996 | Kean | |
| 5,574,930 A | 11/1996 | Halverson, Jr. et al. | |
| 5,574,942 A | 11/1996 | Colwell et al. | |
| 5,579,477 A * | 11/1996 | Ogletree | 714/44 |
| 5,581,745 A | 12/1996 | Muraoka | |
| 5,600,845 A | 2/1997 | Gilson | |
| 5,652,904 A | 7/1997 | Trimberger | |
| 5,671,355 A | 9/1997 | Collins | |
| 5,705,938 A | 1/1998 | Kean | |
| 5,732,250 A | 3/1998 | Bates et al. | |
| 5,737,631 A | 4/1998 | Trimberger | |
| 5,740,404 A | 4/1998 | Baji | |
| 5,742,179 A | 4/1998 | Sasaki | |
| 5,742,180 A | 4/1998 | DeHon et al. | |
| 5,748,979 A | 5/1998 | Trimberger | |
| 5,752,035 A | 5/1998 | Trimberger | |
| 5,760,607 A | 6/1998 | Leeds et al. | |
| 5,809,517 A | 9/1998 | Shimura | |
| 5,835,405 A | 11/1998 | Tsui et al. | |
| 5,867,694 A * | 2/1999 | Billings et al. | 713/501 |
| 5,874,834 A | 2/1999 | New | |
| 5,889,788 A | 3/1999 | Pressly et al. | |
| 5,892,961 A | 4/1999 | Trimberger | |
| 5,914,902 A | 6/1999 | Lawrence et al. | |
| 5,933,023 A | 8/1999 | Young | |
| 5,943,483 A * | 8/1999 | Solomon | 710/107 |
| 5,970,254 A | 10/1999 | Cooke et al. | |
| 6,011,407 A | 1/2000 | New | |
| 6,020,755 A | 2/2000 | Andrews et al. | |
| 6,026,481 A | 2/2000 | New et al. | |
| 6,096,091 A | 8/2000 | Hartmann | |
| 6,134,621 A * | 10/2000 | Kelley et al. | 710/311 |
| 6,154,051 A | 11/2000 | Nguyen et al. | |
| 6,163,166 A | 12/2000 | Bielby et al. | |
| 6,172,990 B1 | 1/2001 | Deb et al. | |
| 6,178,541 B1 | 1/2001 | Joly et al. | |
| 6,181,163 B1 | 1/2001 | Agrawal et al. | |
| 6,211,697 B1 | 4/2001 | Lien et al. | |
| 6,242,945 B1 | 6/2001 | New | |
| 6,243,772 B1 * | 6/2001 | Ghori et al. | 710/68 |
| 6,272,451 B1 | 8/2001 | Mason et al. | |
| 6,279,045 B1 | 8/2001 | Muthujumaraswathy et al. | |
| 6,282,627 B1 | 8/2001 | Wong et al. | |
| 6,301,696 B1 | 10/2001 | Lien et al. | |
| 6,343,207 B1 | 1/2002 | Hessel et al. | |
| 6,353,331 B1 | 3/2002 | Shimanek | |
| 6,356,987 B1 | 3/2002 | Aulas | |
| 6,389,558 B1 | 5/2002 | Herrmann et al. | |
| 6,434,735 B1 | 8/2002 | Watkins | |
| 6,460,172 B1 | 10/2002 | Insenser Farre et al. | |
| 6,507,942 B1 | 1/2003 | Calderone et al. | |
| 6,510,548 B1 | 1/2003 | Squires | |
| 6,518,787 B1 | 2/2003 | Allegrucci et al. | |
| 6,519,753 B1 | 2/2003 | Ang et al. | |
| 6,522,167 B1 | 2/2003 | Ansari et al. | |
| 6,532,572 B1 | 3/2003 | Tetelbaum | |
| 6,539,508 B1 | 3/2003 | Patrie et al. | |
| 6,541,991 B1 | 4/2003 | Horncheck et al. | |
| 6,587,995 B1 | 7/2003 | Duboc et al. | |
| 6,588,006 B1 | 7/2003 | Watkins | |
| 6,601,227 B1 | 7/2003 | Trimberger | |
| 6,604,228 B1 | 8/2003 | Patel et al. | |
| 6,611,893 B1 * | 8/2003 | Lee et al. | 710/309 |
| 6,611,951 B1 | 8/2003 | Tetelbaum et al. | |
| 2001/0049813 A1 | 12/2001 | Chan et al. | |
| 2003/0062922 A1 | 4/2003 | Douglass et al. | |

FOREIGN PATENT DOCUMENTS

| | | |
|---|---|---|
| EP | 0 905 906 A2 | 3/1999 |
| EP | 1 235 351 A1 | 8/2002 |
| WO | WO 93 25968 A1 | 12/1993 |

OTHER PUBLICATIONS

Cary D. Snyder et al., "Xilinx's A-TO-Z System Platform," Cahners Microprocessor Report, Feb. 26, 2001, pp 1-5, Microdesign Resources, www.MDRonline.com, 408-328-3900.

U.S. Appl. No. 09/858,732, filed May 15, 2001, Schulz.

U.S. Appl. No. 09/861,112, filed May 18, 2001, Dao et al.

U.S. Appl. No. 09/917,304, filed Jul. 27, 2001, Douglass et al.

Xilinx, Inc., "The Programmable Logic Data Book," 1994, Revised 1995, Xilinx, Inc, 2100 Logic Drive, San Jose, CA. 95124.

Xilinx, Inc., "The Programmable Logic Data Book," 1994, Revised 1995, pp 2-109 to 2-117, Xilinx, Inc., 2100 Logic Drive, San Jose, CA 95124.

Xilinx, Inc., "The Programmable Logic Data Book," 1994, Revised 1995, pp 2-9 to 2-18, 2-187-2-199, Xilinx, Inc., 2100 Logic Drive, San Jose, CA. 95124.

Xilinx, Inc., "The Programmable Logic Data Book," 1994, Revised 1995, pp 2-107 to 2-108, Xilinx, Inc., 2100 Logic Drive, San Jose, CA 95124.

International Business Machines, "PowerPC 405 Embedded Processor Core User Manual," 1996, 5TH Ed., pp. 1-1 TO X-16, International Business Machines, 1580 Rout 52, Bldg. 504, Hopewell Junction, NY 12533-6531.

Yamin Li et al., "Aizup-A Pipelined Processor Design & Implementation on Xilinx FPGA CHIP," IEEE, Sep. 1996, pp 98-106, 98-106, IEEE, 3 Park Avenue, 17th Floor, New York, NY 10016-5997.

Ralph D. Wittig et al., OneChip: An FPGA Processor with Reconfigurable Logic, Apr. 17, 1996, pp 126-135, IEEE, 3 Park Avenue, 17th Floor, New York, NY 10016-5997.

Xilinx, Inc., "The Programmable Logic Data Book," Jan. 27, 1999, Ch. 3, pp 3-1 to 3-50, Xilinx, Inc., 2100 Logic Drive, San Jose, CA 95124.

William B. Andrew et al., "A Field Programmable System Chip Which Combines FPGA & ASIC Circuitry," IEEE May 16, 1999, pp. 183-186, IEEE, 3 Park Avenue, 17th Floor, New York, NY 10016-5997.

Xilinx, Inc., "The Programmable Logic Data Book," 2000, Ch. 3 pp 3-1 to 3-117, Xilinx, Inc., 2100 Logic Drive, San Jose, CA 95124.

Xilinx, Inc., "The Programmable Logic Data Book," 2000, Ch 3, pp 3-7 TO 3-17; 3-76 TO 3-87, Xilinx, Inc., 2100 Logic Drive, San Jose, CA. 95124.

International Business Machines, "Processor Local Bus" Architecture Specifications, 32-Bit Implementation, Apr. 2000, First Edition, V2.9, pp. 1-76, IBM Corporation, Department H83A, P.O. Box 12195, Research Triangle Park, NC 27709.

Xilinx, Inc., Virtex II Platform FPGA Handbook, Dec. 6, 2000, v1.1, pp 33-75, Xilinx, Inc., 2100 Logic Drive, San Jose, CA. 95124.

Sayfe Kiaei et al., "VLSI Design of Dynamically Reconfigurable Array Processor-Drap," IEEE, Feb. 1989, pp. 2484-2488, V3.6, IEEE, 3 Park Avenue, 17th Floor, New York, NY 10016-5997.

Vason P. Srini, "Field Programmable Gate Array (FPGA) Implementation of Digital Systems: An Alternative to ASIC, " IEEE, May 1991, pp. 309-314, IEEE, 3 Park Avenue, 17th Floor, New York, NY 10016-5997.

G. Maki et al., "A Reconfigurable Data Path Processor," IEEE, Aug. 1991, 18-4.1 to 18-4.4, IEEE, 3 Park Avenue, 17th Floor, New York, NY 10016-5997.

*Jacob Davidson*, "FPGA Implementation of Reconfigurable Microprocessor," IEEE, Mar. 1993, pp. 3.2.1-3.2.4, IEEE, 3 Park Avenue, 17th Floor, New York, NY 10016-5997.

*Christian Iseli et al.*, "Beyond Superscaler Using FPGA's," IEEE, Apr. 1993, pp. 486-490, IEEE, 3 Park Avenue, 17th Floor, New York, NY 10016-5997.

*P.C.French et al.*, "A Self-Reconfiguring Processor,"; IEEE, Jul. 1993, pp. 50-59, IEEE, 3 Park Avenue, 17th Floor, New York, NY 10016-5997.

*Christian Iseli et al.*, "Spyder: A Reconfigurable VLIW Processor Using FPGA's," IEEE, Jul. 1993, pp. 17-24, IEEE, 3 Park Avenue, 17th Floor, New York, NY 10016-5997.

*Michael J. Wirthlin et al.*, "The Nano Processor: A Low Resource Reconfigurable Processor," IEEE, Feb. 1994, pp. 23-30, IEEE, 3 Park Avenue, 17th Floor, New York, NY 10016-5997.

*William S. Carter* "The Future of Programmable Logic and Its Impact on Digital System Design," Apr. 1994, IEEE, pp. 10-16, IEEE, 3 Park Avenue, 17th Floor, New York, NY 10016-5997.

*Andre'Dehon*, "DPGA-Coupled Microprocessors: Commondity ICs for The Early 21St Century,"IEEE, Feb. 1994, pp. 31-39, IEEE, 3 Park Avenue, 17th Floo, New York, NY 10016-5997.

*Osama T. Albaharna*, "Area & Time Limitations of FPGA-Based Virtual Hardware," IEEE, Apr. 1994, pp. 184-189, IEEE, 3 Park Avenue, 17th Floor, New York, NY 10016-5997.

*Christian Iseli et al.*, "AC++ Compiler for FPGA Custom Execution Units Synthesis," 1995, pp. 173-179, IEEE, 3 Park Avenue, 17th Floor, New York, NY 10016-5997.

* cited by examiner

METHOD AND APPARATUS FOR
SYNCHRONIZED BUSES

BACKGROUND

1. Technical Field

The present invention relates to bus and computer architectures and, more specifically, to maximizing throughput rates on synchronized buses.

2. Related Art

Microprocessor-based systems typically include the processor itself, as well as memory and input/output (I/O) devices. Typically, the processor, memory and I/O devices communicate with each other over a bus. A bus is a shared communication link that uses a plurality of wires to connect various devices or systems. By defining a single connection scheme, new devices can be added and peripherals may be moved between computer systems that share the same type of bus. Thus, buses are cost effective because a single set of wires or traces, if formed in an integrated package, may be shared by multiple devices for exchanging communication signals.

One disadvantage of utilizing bus architectures is that they create communication bottlenecks, thereby limiting the maximum throughput of communication signals. When each device must communicate over a single bus, that bus must be shared. The bandwidth of the bus limits the I/O throughput, as well as the number of devices and amount of data that must be transmitted thereon. In high-end commercial systems and in supercomputers, where I/O rates must be very high because processor performance is high, designing a bus system capable of meeting the demands of the processor, as well as connecting large numbers of I/O devices, represents a significant challenge. Accordingly, it is frequently a design goal to maximize the bus throughput.

One of the reasons why bus design is difficult is that the bus speed and capacity is limited by many factors, including the length of the bus and the number of devices on the bus. Each device that is coupled to the bus adds to the capacitance of the bus thereby increasing the bus impedance and limiting throughput. The physical limits, therefore, prevent the bus from running arbitrarily fast. Moreover, the individual devices on the bus have their own clock rates. Thus, between two devices, the slowest device limits the speed of the communications. Often, because of this, bus designs are implemented in a way that slows the speed of the bus to match that of the slowest device on the bus to insure that all devices can communicate over the bus. While limiting the bus speed to the speed of the slowest device solves the interoperability issues that correspond with the differences in speed, the goal of maximizing bus throughput and high bandwidth are compromised to achieve this result.

A bus is more than just a twisted pair, as is commonly thought. Typically, a bus contains a set of control lines, as well as a set of data lines. The control lines are used to signal requests and acknowledgments, and to indicate what type of information is on the data lines. The data lines carry information between the source and destination for a specific operation. This information can be formed of data, commands, and addresses.

The control lines are used to indicate what type of information is contained on the data lines at each point in the transfer. Some buses even include two sets of signal lines to separately communicate both data and address in a single bus transmission. With either design, however, the control lines are used to indicate what type of data the bus contains and the bus protocol implemented. Because the bus is shared, the protocol also must determine the priority to which the various devices are allowed to communicate on the bus.

There are different types of buses that are commonly used. Processor-memory buses, I/O buses and backplane buses are each designed to achieve certain design goals. Processor-memory buses are short, high-speed buses that are matched to the memory system so as to maximize processor-memory bandwidth. I/O buses, on the other hand, can be long and can have many types of devices connected to them. I/O buses often have a wide range in the data bandwidth of the devices connected to them and a wide range of the speed at which the bus may operate.

As was discussed before, traditionally, the bus speed is matched to that of the slowest device. I/O buses do not typically interface directly to the memory. I/O devices typically use a processor-memory or a backplane bus to connect to memory. Backplane buses are designed to allow processors, memory and I/O devices to co-exist on a single bus. They balance the demands of processor/memory communication with the demands of I/O device-memory communication. Backplane buses are often built into the "backplane" or interconnection structure within the chassis of the box. Processor-memory and I/O boards are then plugged into the backplane using the bus for communication.

Processor-memory buses are often designed for a specific function, namely, to enable a processor to have fast access to memory registers. I/O buses and backplane buses, in contrast, are frequently reused in different machines with different devices connected thereto. Backplane and I/O buses are often considered to be standard buses in that they are used by many computers made by different manufacturers. In contrast, processor-memory buses are often proprietary and not readily accessible by other devices.

During the design phase of a bus architecture, the designer of a processor-memory bus knows all of the types of devices that must connect to the bus. As was discussed before, however, I/O and backplane buses must be designed to handle unknown devices that vary in latency and bandwidth. Normally, the I/O bus presents a simple and low-level interface to a device requiring minimal additional electronics to interface with the bus.

The substantial differences between the design and implementation of processor-memory buses and I/O or backplane buses lead to two different communication schemes on the bus. Synchronous buses include a clock in the control lines and a fixed protocol for communicating that is relative to the clock. Asynchronous buses, on the other hand, are not clocked.

Because synchronized buses communicate relative to a clock that is specified in the control lines, the overhead logic for achieving a successful communication is simpler than with asynchronous buses. For example, in a processor-memory bus performing a read operation from memory, the protocol might include transmitting the address and read commands on a first clock cycle and using control lines at the same time to indicate the type of request. The memory then responds with the data word on the fifth clock cycle. This type of protocol may be implemented easily with a state machine. Because the protocol is specified and involves little logic, the bus can run fast with little overhead.

Synchronous buses have two disadvantages, however. First, the conventional wisdom is that every device on a bus must run at the same clock rate. Second, because of clock skew that can result from many factors, including line impedance, synchronous buses can not be very long if they are fast. As was discussed before, adding devices to a bus increases the capacitance of the bus. Therefore, as a bus gets longer with more devices, the increased capacitance increases the bus impedance thereby reducing the bus speed.

Asynchronous buses, on the other hand, are not clocked. Thus, the problems of clock skew and synchronization do not exist on asynchronous buses. However, to coordinate the transmission of data between a sender and receiver, a more complex hand-shaking protocol must be used. The hand-shaking protocol comprises a series of steps in which the sender and receiver proceed to the next step only when both parties agree as to a transaction that just took place.

As was discussed before, it is desirable to increase the throughput and bandwidth of a bus. The types of factors that affect the throughput capacity of the bus include the speed of the bus, the data bus width, separation of address and data lines, and the ability of a bus to implement block transfers. To implement these enhancements that improve bus throughput, however, additional bus lines, increased complexity, or increased response time for requests may be incurred, especially for long block transfers.

Another issue that is significant in designing a bus is the determination as to how a device reserves bus resources for a given transaction. Without a bus allocation mechanism, multiple devices may desire to communicate with each other simultaneously which could result in collisions between communication signals. While there are bus designs that allow for collisions, such designs are not common. Accordingly, bus designs typically have at least one bus master to control the bus operations. A bus master controls access to the bus, meaning that it initiates and controls all bus requests. The processor must be able to initiate a bus request for memory and thus is always a bus master. The memory, typically, is a slave since it responds to read and write requests that are never generated by its own request.

The simplest designs include buses that have only one bus master. Having a single bus master is analogous to a meeting in which each person is only allowed to speak when he or she is asked a question. An advantage of this approach is simplicity. A disadvantage is that a single bus master must be involved in every transaction upon the bus, thereby increasing overhead and reducing efficiency. Furthermore, this design cannot address the requirements of systems which naturally possess multiple masters such as multiprocessor systems or systems containing Direct Memory Access (DMA) devices.

An alternative approach is a design which includes multiple bus masters in which each bus master is able to initiate a transfer. One issue that arises from having multiple bus masters, however, is that a protocol must be developed for deciding which bus master will next get to utilize bus resources for a communication or transaction. Thus, a mechanism for arbitrating access to the bus must be implemented.

There are a variety of schemes for bus arbitration. These schemes include implementing specialized hardware devices that function as bus arbiters. A bus arbiter may implement very sophisticated bus protocols that each master may follow to determine who has priority. In those systems in which a hardware device is used as a bus arbiter, any master wanting to use the bus must generate a bus request to the arbiter and must wait at least until the request is granted. After a grant is received, the device (bus master) can use the bus. The master then signals the arbiter when the bus is no longer required or, alternatively, when the present transaction is complete. Once the bus is no longer required, the arbiter may grant the bus to another master or device. Most multiple master buses have a set of bus lines between each master and the arbiter for performing the requests and grants. A bus release line is often utilized for each device that does not have its own request line. In some networks, the signals used for bus arbitration have physically separate lines, while in other systems the data and control lines on the bus are used for this function.

Many arbitration schemes may be implemented to determine which bus master has priority. A simple approach for determining priority is to use a round-robin mechanism in which all masters are allowed to have the bus one after another in a fixed order. Another scheme may implement a First-In-First-Out (FIFO) protocol wherein the bus requests are merely queued and honored in the order received. In a more complex scheme, the priority of the communication may be determinative as to what master receives priority to a bus. For example, certain types of transactions may be deemed to be higher priority than other transactions. But even designs where priority is considered, a staleness of a request is often considered so that a low priority request is not ignored, potentially, forever.

Even with the various bus topologies, the fundamental characteristic of the bus still exists. As was stated before, the conventional wisdom is that the synchronous bus speed is set to match the speed of the slowest transaction that may occur on the bus. What is needed, therefore, is a bus protocol and design that facilitates increasing the speed of the buses while not overlooking the restriction requirements placed by the various devices coupled to communicate on the bus.

SUMMARY OF THE INVENTION

A system and method are provided that enable a bus to have its frequency adjusted according to a transaction that is to occur thereon. More specifically, in a system that includes a plurality of masters and slaves connected via at least one shared synchronous bus, a bus arbiter determines the speed of the bus by analyzing the source and destination of a transaction. Accordingly, the bus speed or frequency may be increased to an optimal value to improve the bus throughput. In order to set the bus speed appropriately, the arbiter must become aware of which devices will be part of a transaction, as well as the internal frequencies of those devices, and the ability of the bus to conduct a signal at those frequencies. For example, if a master operates at a first frequency that is faster than a receiver's frequency, here a second frequency, then the bus arbiter will set the bus clock frequency to be no greater than the frequency of the receiver. The speed of the bus is assumed to be slower than or equal to the speed of any master or slave. To connect a device which operates at a frequency that is faster than the speed of the bus, a bridge with appropriate buffering is used in the described embodiment of the invention.

Additionally, the bus arbiter will set the frequency to one that is not too high considering the delay on the bus between the two devices and the number of cycles required to transmit a signal from one device to another. This delay is directly affected by the distance and the impedance of the media between the master and the slave. As is explained in greater detail herein, the master and slave devices are equipped with a specific circuitry to make them able to determine the frequency of the bus and to respond, or latch data in their appropriate clock cycle.

The present invention contemplates an architecture in which the bus speed may be changed on a frequent basis. To accomplish this, the devices connected to the bus determine the bus frequency relative to their own internal frequency in order to determine when valid data exists on the bus and when that data should be latched. Accordingly, each device coupled to the bus includes a state machine that compares clock cycle pulses of the bus relative to its own internal clock. According to its determination about the relative speed differences between the bus and its internal clock, the state machine within the device generates a sample cycle pulse to determine when the data on the bus is valid and could be sampled or latched.

In order to select an appropriate bus frequency, the bus arbiter receives a request from a master for bus resources. As a part of the request, or as a part of a separate signal, the master requesting bus resources also generates an address of the destination for the transaction. While an address will subsequently be used to actually cause the recipient of the transaction to receive and process the data on the bus, an address must also be present before hand so that the bus arbiter can determine a bus speed that is appropriate for both the master and the slave. Thus, when a bus request is submitted to the arbiter by a master, the bus arbiter selects a frequency based on the identities of the requesting master and the targeted slave and sets the bus speed or frequency to the selected frequency. The sample cycle blocks in the master and the slave will detect the new frequency and provide the sample cycle pulse at the right time for those devices to operate correctly. Next, the arbiter sends the grant signal to the master requesting for the bus resources.

Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

The present invention provides a mechanism by which a group of devices which operate at various frequencies can be connected through a shared synchronous bus. The invention presents a method for allowing the bus speed to be set according to the transaction on the bus. This enables the bus to run at the most optimal speed to maximize its throughput.

Figure 1:
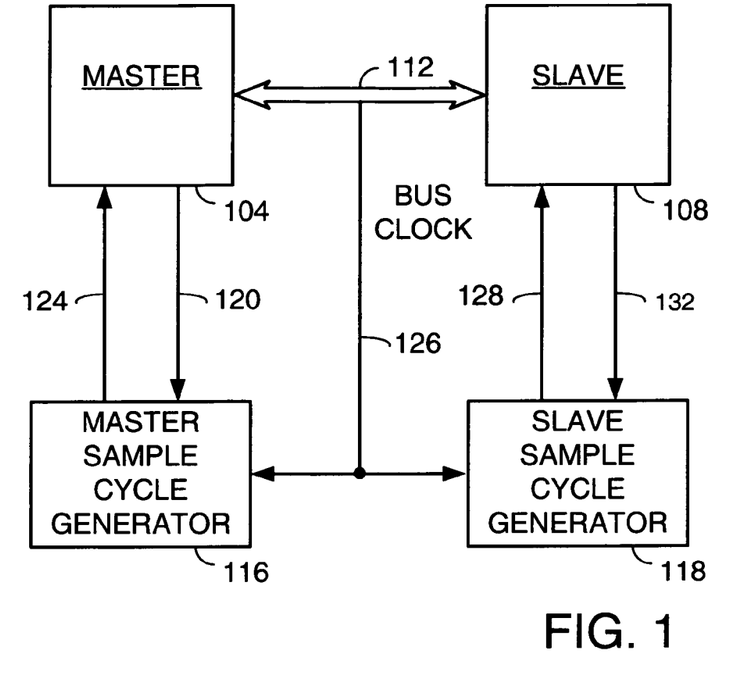
FIG. 1 is a functional block diagram illustrating a master in communication with a slave over a bus according to one embodiment of the present invention.

FIG. 1 is a functional block diagram illustrating a master in communication with a slave over a bus according to one embodiment of the present invention. A master 104 communicates with a slave 108 over a bus 112. The master is coupled to a master sample cycle generator module 116 to receive a sample cycle signal over a line 124. The master sample cycle module 116 receives a copy of the master's internal clock over a line 120. A bus clock 126 generates the sample cycle signal 124 for the master according to the two clock inputs. Similarly, a slave 108 is coupled to a slave sample cycle generator module 118 which provides the sample cycle signal 128 to it. The sample cycle block receives a copy of the slave's internal clock 132 and the bus clock 126 and generates the sample cycle signal 128 for the slave, accordingly. The sample cycle signal 128 determines when the master 104 is placing valid data on the bus that is to be latched.

One function of a bus arbiter, according to the described embodiment of the invention, therefore, is to determine an appropriate bus speed for bus 112 based on the different clock speeds of the devices participating in a transaction. Many different approaches may be implemented to solve this problem, including the common one of having the bus communicate at the speed of the slower of the two devices, namely master 104 and slave 108. Another approach is to enable the bus to transmit at the highest possible speed and to create a bridge between the device which operates slower than the bus to buffer the overflow of data. For the present example, the assumption is made that the master 104 and the slave 108 have much higher clock rates than the bus clock 126.

In one embodiment of the invention, both the master 104 and the slave 108 include internal state machines to perform the function of sample cycle generators 116 and 118. In the example of FIG. 1, however, sample cycle generators 116 and 118 are shown outside the master and the slave to aid in the explanation of design issues and inventive concepts. Sample cycle generator 116 specifies to slave 108 when it is to read data on bus 112 as transmitted from master 104. In general, the invention includes the sample cycle generators 116 and 118 which count the internal clock rates of master 104 and slave 108 and compare them to the clock rate of the bus. A better understanding of the comparison of clock pulses can be had in reference to the description of FIG. 2.

Figure 2:
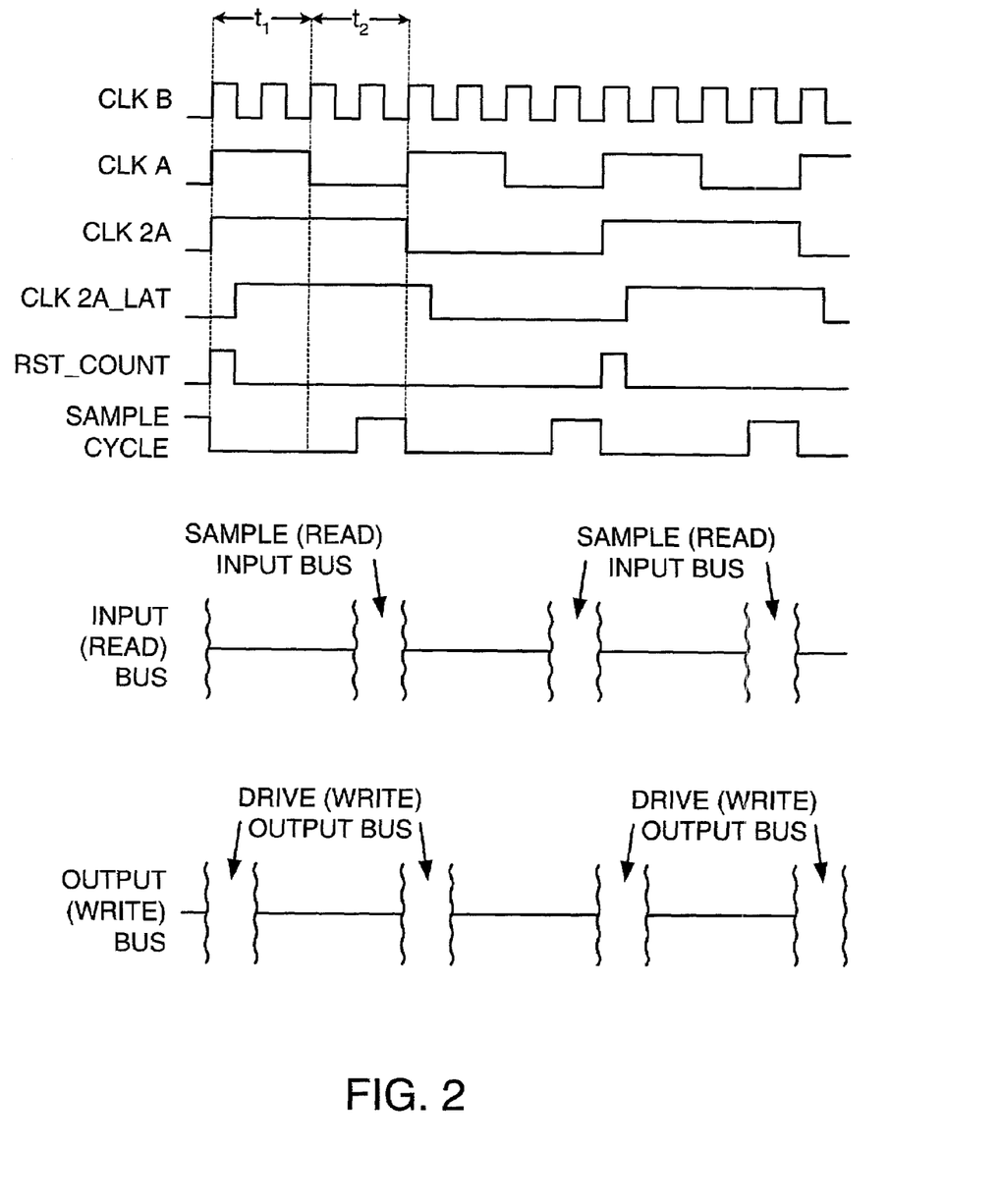
FIG. 2 is a timing diagram that illustrates the relationship of the various signals generated on the bus, as well as by the state machine.

FIG. 2 is a timing diagram that illustrates the relationship of the various signals generated on the bus, as well as by the state machine. More specifically, four clock cycles elapse for B clock in the time period of one A clock cycle as indicated by the sum of $t_1+t_2$. Thus, it may be seen that the B clock is four times faster than the A clock in the described example of one embodiment of the invention. In the described embodiment of the invention, an internal state machine is formed within a device that is connected to a bus to accurately determine the speed difference between the device clock and the bus clock. It is important to note that, in the described embodiment, the logic internal to the device is only switched by the device clock or the faster clock, namely clock B.

The state machine of the described embodiment of the present invention counts the falling edges of the faster clock in two periods of the slower clock and divides that by 2 to determine the ratio between the faster and the slower clock. The state machine determines the start and stop points of the interval in which the count has to take place. To do so requires several steps. First CLKA is divided by two to generate CLK2A which is half as slow as CLKA. CLK2A is latched at every negative edge of the device clock or CLKB, shown generally at 204, to generate CLK2A_lat. The signal RST_count is generated whenever CLK2A is high and CLK2A_lat is low. The signal RST_count represents the start of a period on CLK2A. This signal is used to reset the counter which counts the number of negative clock edges of CLKB. The value of the counter right before it is reset will be twice the ratio of CLKB to CLKA. The reason that the falling edges are counted instead of the rising edges is that accurate ratios may be determined more quickly by counting negative edges. Additionally, counting negative edges provides more tolerance for clock skew. As may be seen, the timing signals of FIG. 2 illustrates that the bus is a synchronized bus. Because the initial rising edges may not be detected until after they are passed, if the state machine merely counted rising edges, it would possible miss the first rising edge of CLKB and the number of counted edges may be off by one. The reason for counting the negative edges of CLKB in two periods of CLKA and dividing the number by two, rather than just counting the edges in one period is that if both clocks are equal the latter method will not work.

Continuing to examine FIG. 2, one issue that is presented relates to when a slave, such as slave 108 of FIG. 1, reads or latches data on the bus given the differences in the clock speeds. The present invention solves this problem by utilizing state machine or other circuitry/logic formed internally to each device that can act as a slave for a transaction bus speed. Alternatively, the state machine or functionally equivalent circuitry may be formed externally to provide latching information to the communication device that is a slave for a particular transaction. Generally, the state machine or circuitry determines the ratio of the clocks and generates the internal sample cycle as is shown in FIG. 2. A generator/state machine is able to determine when to sample or latch the input buses thereby enabling the slave to determine when to latch or read a signal.

Without issuing sample pulses to prompt the slave 108 to latch the bus 112, the slave would not know on which of its (B clock) clock cycles to latch the bus. The reason is that the slave is operating at a much higher rate of speed than the bus (A clock). Accordingly, whether the slave latches good data or bad data depends on its ability to accurately determine when the bus has valid data. Thus, the internal state machine generates a sample clock signal whenever it is time to sample, or read, the data. Thus, as may be seen in FIG. 2, the state machine, after determining the ratio of clock pulses between the A clock and the B clock, is able to determine when the sample cycle signal, as shown in FIG. 2, is to be generated. Furthermore, the device always drives its output bus, or writes to its outputs, in the CLKB cycle following the sample cycle pulse.

The sample cycle signal periodically issues on the last cycle of the fast clock, here, the B clock, before the rising edge of the slow clock, here, the A clock. If both clocks are equal, the sample cycle signal will always be high.

Once a slave such as slave 108 has latched data pulse 228 on bus 112, it may write on the subsequent clock pulse. The device has to drive its write signal until the next sample cycle pulse. As may be seen in the example of FIG. 2, the slave 108 is formed to include logic to prompt it to sample while the sample pulse is high and then to drive data immediately thereafter.

Referring again to FIG. 1, the figure illustrates an external sample cycle generator that generates sample clock pulses. Typically, the bus speed will be limited by the length of the bus, as well as the capacitance on the bus and the resulting impedance that is created by the number of devices attached to the bus, as has been described herein. FIG. 1 also illustrates that a slave 108 may continue to process data at its own speed and that it must determine when it should latch the data on bus 112. Similarly, master 104 is allowed to operate at its own internal clock speed. In one embodiment of the present invention, each device has an internal state machine that performs the function of sample cycle generator 116 or 118. Accordingly, each machine is able to determine the speed of the bus and to compare that clock rate with its internal clock rate to determine when to sample or latch the data on bus 112. The signal timing diagram of FIG. 2 represents an embodiment that includes state machines within each receiver.

Figure 3:
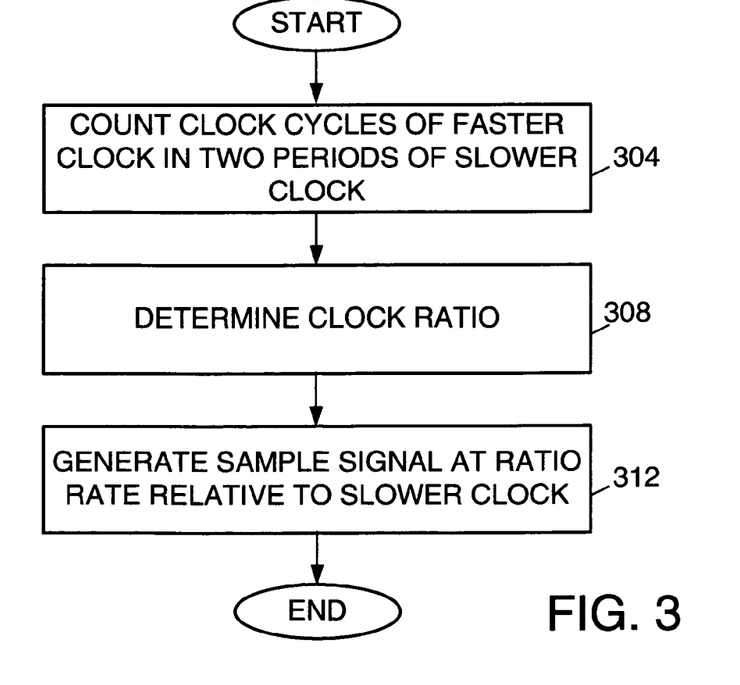
FIG. 3 is a flowchart illustrating the operation of the sample generator or state machine, according to one embodiment of the present invention.

FIG. 3 is a flowchart illustrating the operation of the sample cycle generator or state machine, according to one embodiment of the present invention. The logic of the state machine basically includes counting clock cycles of the faster clock in two periods of the slower clock (step 304) and determining a clock ratio (step 308). Thereafter, the state machine or sample cycle generator generates sample cycle signals at a ratio rate that is relative to the slower clock (step 312). As was described earlier, the communication protocol must be known. Thus, if a device transmitting at the slower clock rate is known to always transmit on the second half of a clock pulse, for example, then the state machine can determine when the second half of the clock pulse for the slower clock rate is occurring and can generate a sample signal at that time.

Figure 4:
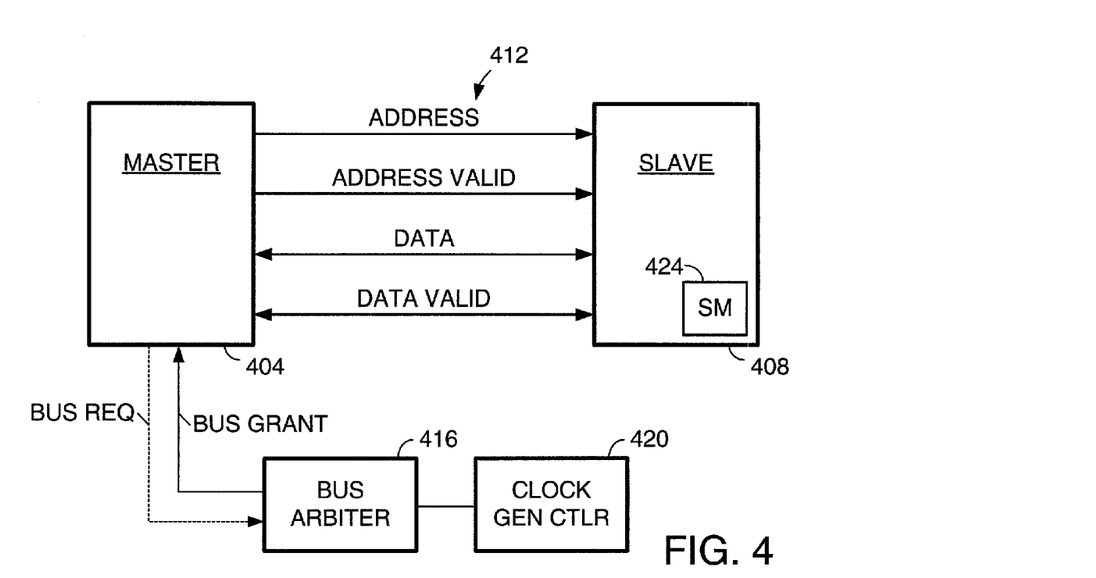
FIG. 4 is a functional block diagram illustrating typical communication protocols between a master and a slave.

FIG. 4 is a functional block diagram illustrating communication protocol signals between a master and a slave. A master 404 and a slave 408 communicate over a bus, shown generally at 412, which comprises a plurality of control and data lines. As is shown in FIG. 4, the master 404 generates a signal that defines the address of the slave 408 to which it wishes to send a transaction, it sets an address valid signal, it transmits the data over a data line, and generates a data valid signal. Accordingly, slave 408, while monitoring the control lines that carry the destination address determines that its address has been put on the control line. It also observes that the address valid signal is set indicating that a real transaction is beginning to occur. Thereafter, the slave, while listening for its communication or transaction, sees the data and the data valid signal, which enables it to know that the data is read and is to be processed.

In the example of FIG. 4, two or more lines may be used to conduct each of the signals shown therein. For example, at a minimum, the data line would be separate from the control line that carries the address, address valid and data valid signals. In another embodiment of the invention, a control line exists for each of these three signals. As is understood by those skilled in the art, there are many other types of control signals that are routinely generated. Those control signals, however, are not shown here for simplicity, as they are known by those skilled in the art.

Continuing to examine FIG. 4, a bus arbiter 416 is coupled to communicate with master 404, as well as with a clock generation controller 420 in the described embodiment of the invention. Thus, when the master seeks to "own" the bus for the transaction with slave 408, it generates a request to bus arbiter 416 indicating the same, as well as the nature of the transaction. Bus arbiter then communicates with clock generation controller 420 to determine a corresponding clock speed for the transaction requested by bus master 404. Bus arbiter 416 then selects a specified bus clock speed for the transaction of master 404. Bus arbiter 416 also generates a Bus Grant signal to master 404 indicating that it has control of the bus. Thus, prior to master 404 actually transmitting the data to slave 408 and the data valid signal, as was discussed earlier, it must determine the bus speed that is to be utilized for the transaction. While the described embodiment illustrates a clock generation controller 420 that is separate from bus arbiter 416, it is understood that the clock generation controller 420 may readily be formed within or replaced by logic or other circuitry formed within bus arbiter 416. Thus, references to the bus arbiter 416 implicitly include or assume the functionality of clock generation controller 420 in conjunction with the functionality of bus arbiter 416.

In the described embodiment, the clock generation controller 420 generates the clock pulses at a select frequency for the present transaction. Thus, the master 404 must transmit its synchronized signals at a frequency that matches the bus frequency. Then, once the transaction is complete, master 404 generates a signal that effectively indicates that it is releasing the bus to allow another master on the bus to gain access for its transaction. Thus, bus arbiter 416 evaluates the bus access request from the plurality of masters and controls which master has access to the bus at any particular time.

Slave 408 includes, as may be seen, a state machine 424 that evaluates the speed of the bus relative to its own internal clock speed to determine when to generate sample cycle pulses to read the data thereon according to a described embodiment of the present invention.

Figure 5:
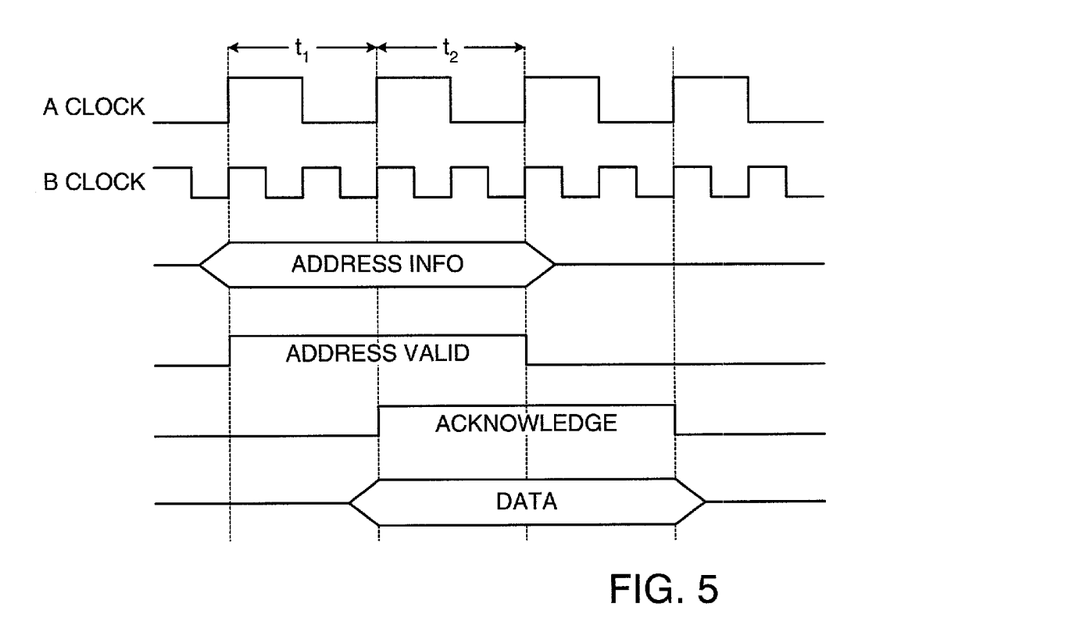
FIG. 5 is a signal timing diagram that illustrates the relationship between the A clock, which here is the bus clock speed, in relation to the generation of slave address information, an address valid signal, an acknowledged signal, and the actual data.

FIG. 5 is a signal timing diagram that illustrates the relationship between the A clock, which here is the bus clock speed, the B clock (clock of the receiver or slave) and the transmission of slave address information, an address valid signal, an acknowledge signal, and the actual data. As may be seen, the B clock speed frequency is twice that of the A clock. As is suggested by FIG. 5, the address valid signal is set on a control line at the same time that address information is transmitted on the bus on an address line in the described embodiment of the invention. Additionally, an acknowledge signal is generated by the slave and is returned to the master, as shown here in FIG. 5, one bus clock cycle after receipt. Accordingly, master 404 (of FIG. 4) is able to generate data and a data valid signal on its second clock pulse.

FIG. 5 represents a synchronized bus in which all transactions are initiated at fixed locations in time in a synchronous manner. As is understood by one skilled in the art, the receiver can latch the address information and the address valid information prior to termination of a given bus clock cycle. This enables it to prepare the response that may be issued at the next synchronized instant that it is allowed to generate the response.

Figure 6:
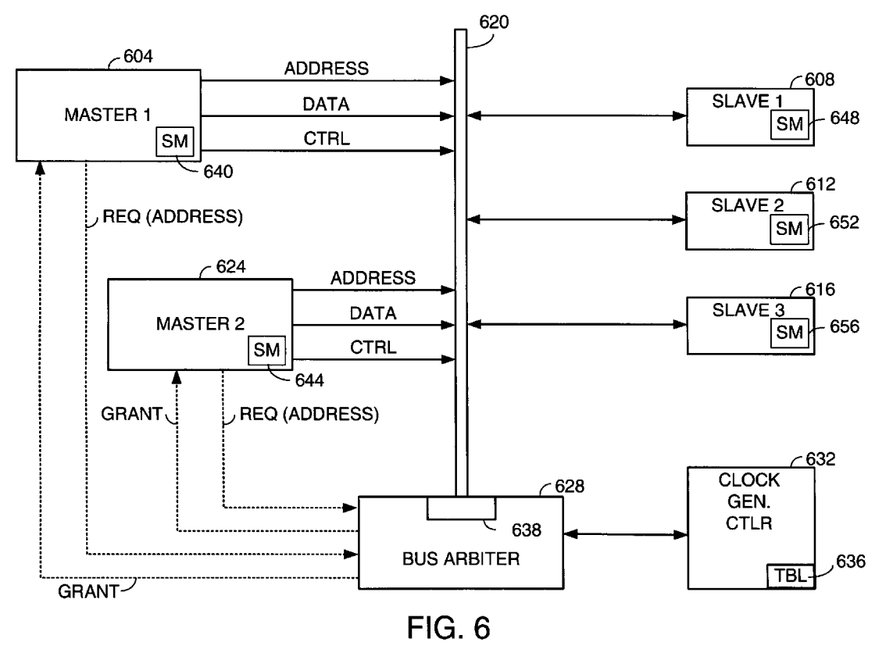
FIG. 6 is a functional block diagram illustrating the operation of a bus according to one embodiment of the present invention.

FIG. 6 is a functional block diagram illustrating the operation of a bus according to one embodiment of the present invention. Referring now to FIG. 6, a master 604 is coupled to communicate with any one of a plurality of slaves 608, 612 or 616 over a bus 620. A second master, namely master 624, also is coupled to communicate over bus 620 with the same three slaves. Because there are at least two masters in the network of FIG. 6, a bus arbiter 628 is required to determine which master 604 or 624 can access and control communications on the bus and a bus rate or speed for the required transaction.

Additionally, bus arbiter 628 is coupled to communicate with a clock generation controller 632, which is utilized for driving the bus or determining the clock speed of the bus. Bus arbiter 628 further includes a set of input ports 638 through which bus communications are monitored and controlled, not including the control signals that are generated by dedicated lines. Clock generation controller 632 further includes a memory for storing a transactions speed table 636 which is used to determine a corresponding bus rate for a given transaction between a master 604 or 624 and a slave 608, 612 or 616. In the described embodiment, the transaction speeds are determined statically and are stored within table 636. The specific factors that are considered in determining the parameters of table 636 will be described in more detail below. In general, however, the parameters that effect the bus speed include an examination of the source of the communication or transaction, the destination, the length of bus between the two, the number of devices connected to the bus, and other factors such as the relative frequency rates between the two devices. The specific considerations in determining the parameters that affect the transaction speed values that are stored within table 636 are described in greater detail below.

As it may also be seen, each master 604 and 624 has at least two dedicated control lines that couple it to the bus arbiter 628. More specifically, each master 604 and 624 is coupled to transmit a bus request to arbiter 628. For the bus arbiter to determine a bus speed, it needs to know the address of the destination. Accordingly, in one embodiment of the present invention, the request for control of the bus by a master comprises an address of the destination for the transaction. In another embodiment of the present invention, the address is transmitted on a separate control line. The bus arbiter 628 then executes its arbitration logic to determine which master has priority to the bus and generates a grant signal thereto. As is understood by those skilled in the art, in one scheme, the grant signal is only generated at the time that the master is allowed to take control of the bus. In another scheme, the bus arbiter 628 may generate the grant signal in advance of the master having control of the bus. In this scheme, once the master 604 or 624 receives the grant signal, it monitors activity of the bus and takes control only when another master that presently has control generates a signal over the bus relinquishing control. At the time a transaction terminates, the clock generation controller 632 begins to drive the bus at a select frequency for the upcoming (next) transaction (which it knows because the destination address was delivered to the master with the access request).

There are many algorithms that may be implemented to determine which master 604 or 624 has priority for a transaction on bus 620. One algorithm is very simple and is known as a round-robin algorithm in which all masters are allowed to have the bus one after another in a fixed order. In another simple algorithm, priority is granted based on the order in which the bus request was received. This algorithm is referred to as the First-In-First-Out (FIFO) algorithms. In another embodiment, the bus arbiter examines the destination address, as well as the source address of the master and determines priority therefrom. In yet another embodiment, a transaction type is specified in which priority is given based on the type of the transaction, as well as the source or destination of the transaction. The various schemes for assigning priority among the various masters are known and any such scheme may be implemented herein as part of the present invention.

In operation, in one embodiment of the present invention, a master, for example, master 624, generates a request to bus arbiter 628 to gain control of bus 620 for a transaction. In addition to generating the request, master 624 specifies an address of a slave to which the communication is to be transmitted. For example, master 624 might specify that slave 616 is the intended destination for the requested transaction. In the example herein, bus arbiter 628 will evaluate all pending requests for bus control from the various masters and will determine the relative priority of the request. If, for this example, master 624 is assigned the highest priority, meaning that it will get access to the bus next, then bus arbiter will wait until the master that presently has control of the bus relinquishes its control.

In the present example, assume that master 604 is engaged in a transaction with slave 612. Once master 604 completes the transaction, it generates a signal to indicate that it relinquishes control of the bus. When bus arbiter 628 detects the signal relinquishing control of the bus transmitted from master 604, the bus arbiter grants control to master 624. Prior to doing so, however, bus arbiter 628 evaluates the source of the new transaction, namely master 624, the destination of the new transaction, namely slave 616, and evaluates an appropriate speed for the transaction. In the example shown in FIG. 6, bus arbiter 628 communicates with a clock generation controller 632 to make the determination. It is understood, however, that clock generation controller 632 may be a module formed within bus arbiter 628. Clock generation controller 632 further includes table 636, which enables it to determine an appropriate bus speed for the transaction between master 624 and slave 616.

Once bus arbiter 628 (and/or clock generation controller 632) determines a corresponding bus frequency, the bus arbiter 628 (and the clock generation controller 632) sets the clock rate for bus 620 to the new clock rate before it generates the grant signal to master 624. At this point, the bus is granted by the arbiter 628 to master 624. Thereafter, master 624 generates its transaction at the clock speed that is established for the bus 620 and that is being generated by bus arbiter 628.

Once second master 624 starts a transaction on bus 620, which transaction is at a frequency that is equal to that of bus 620 as specified by bus arbiter 628 (and/or clock generation controller 632), slave 616 must determine the relative difference between its internal clock frequency rate and the clock frequency rate of bus 620. The algorithm for determining the relative difference in the frequency rates, as previously described, is implemented by a state machine 648 that is formed within slave 608. As may be seen, slave 612 also includes a similar state machine 652 and slave 616 includes a similar state machine 656. Thus, after two transient cycles, state machine 648 generates correct internal sample cycle pulses which enable slave 608 to determine when there is valid data on bus 620 as a part of the transaction being generated by second master 624. Each of the state machines 648, 652 and 656 of slaves 616, 608, and 612, respectively, continuously monitor communications on bus 620 to determine the relative clock rate of bus 620 to their own internal clock rates.

Each master and slave device includes state machines that are used for synchronizing the device to the set bus speed (as set by the arbiter). Masters 604 and 624 include state machines 640 and 644, respectively, while slaves 608, 612 and 616 include state machines 648, 652, 656, respectively, for synchronization. Because each slave and master includes a state machine that continuously monitors the bus frequency and can determine when sample cycle pulses should be generated for the corresponding device to read data on bus 620, the present invention enables a design in which bus arbiter 628 and clock generation controller 632 may change the frequencies and speed of bus 620 according to the transaction that is to take place. As such, overall bus efficiency is increased and the requirement for a receiver to build a cache for receiving data is reduced or perhaps eliminated. Thus, transmission efficiencies are increased and throughput capacity is increased as well.

Figure 7:
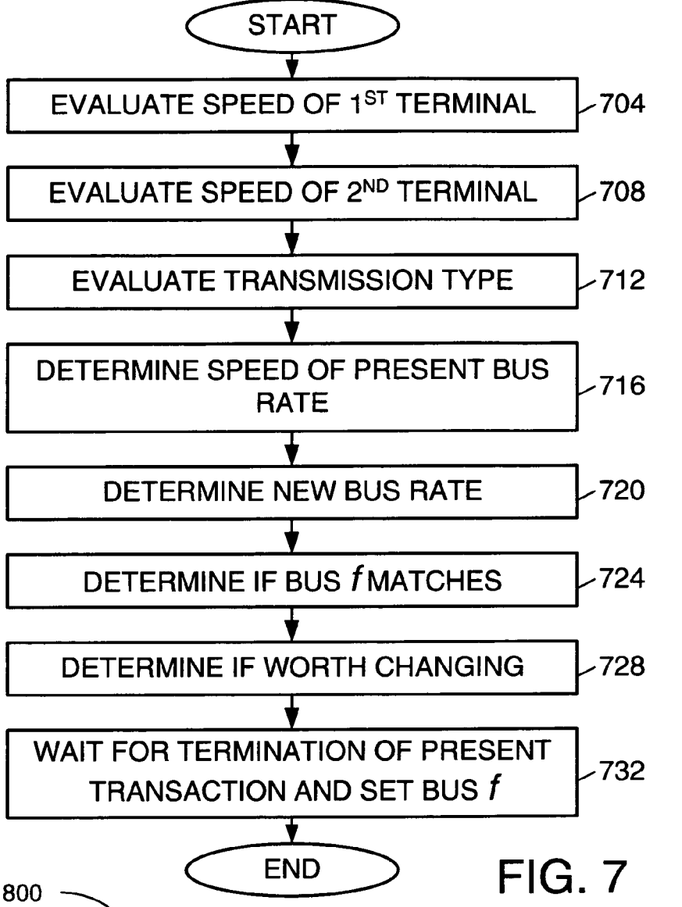
FIG. 7 is a flowchart that illustrates a method performed by a bus arbiter for setting a bus frequency or speed, according to one embodiment of the present invention.

FIG. 7 is a flowchart that illustrates a method performed by a bus arbiter for setting a bus frequency or speed, according to one embodiment of the present invention. Initially, a master, for example, master 604 of FIG. 6, generates a request for access and control of the bus over a dedicated control line to a bus arbiter, for example, bus arbiter 628 of FIG. 6. Based upon that request, the bus arbiter 628 is able to identify the master seeking access to the bus. Because it is able to identify the master, it knows the speed of the master terminal. Additionally, as has been described in relation to FIG. 6, the master requesting access to the bus also is required to specify either in its request, or through some other manner, the address of the slave with which it is wanting to communicate for a particular transaction. Accordingly, because the slave is identified along with the request, the bus arbiter also is able to identify and determine the speed of the slave or second terminal.

The process of determining the speed of the terminals can be one that is dynamic, meaning that the bus arbiter physically performs a look-up to a table to determine the speed of each device in order to calculate the bus frequency that is to be set. Alternatively, it may use a look-up table as was described in FIG. 6, more particularly, table 636. In either form, the invention includes evaluating the speed of the first terminal (step 704) and the speed of the second terminal (step 708). The steps specifically include making the static determination that is implicit in a table that defines the speed of the bus given the two terminals that are to engage in the transaction. After evaluating the speed of the first and second terminals, the bus arbiter must also evaluate the transmission type (step 712) and the frequency of the present bus rate (step 716). For example, there are many different types of transmissions including those that require heavy degrees of validation and those that require no validation at all, such as a block read from memory.

According to the type of transmission and the speed of the first and second terminals, the bus arbiter determines the new bus rate for the requested transaction (step 720).

As has been mentioned previously, the step of determining the new bus rate can be as simple as examining a statically defined value for the known parameters. A table that relates bus rates according to the identity of the terminals communicating in a transaction is required to have bus frequencies that account for the terminal speeds. Accordingly, the step of determining the speed of the first and second terminals is implicit and is a step that was performed in generating the table.

Additionally, the invention includes determining if the bus frequency presently matches the new bus rate or rather a change is required (step 724). If the bus frequencies do not match, the invention includes determining whether a change to the new bus frequency should occur (step 728). For example, if the new bus frequency is lower, then it is worth changing always because there is a requirement for that bus speed to be lower. Stated differently, the bus speeds defined in table 636 are a maximum speed at which communications will certainly occur. Thus, the newly determined bus speed is a maximum speed/frequency. On the other hand, if the new bus frequency is higher than the present one, then it may not be worth changing.

For example, if the transaction type is something that does not require a very high throughput and does not involve more than the transmission of a few signals, it may not be worth changing the frequency because of the inherent delays associated with effecting the change versus the loss in transmission speed. If the speed of the bus is worth changing, then the invention includes waiting for termination of the present transaction as specified by the master of the present transaction and, upon receiving determination indication, setting the bus frequency to the new frequency (step 732).

The method of FIG. 7 illustrates that the bus arbiter controls the frequency or bus rate according to a plurality of parameters including the speed of the first terminal, the speed of the second terminal, the distance between the first and second terminals, the number of devices coupled between the first and second terminals, the type of transmission or transaction and the size of the transaction. As has also been mentioned, one approach would be to dynamically determine the bus frequency based on all the information that is determined through each of the steps defined in FIG. 7. Alternatively, however, those determinations may be implicitly considered and be part of a static table that defines the frequencies according to the various conditions.

The method of FIG. 7 may also be performed by each bus master. This alternate embodiment requires each master to include the arbitration logic of bus arbiter 628 and the clock generation control logic of clock generation controller 632. Accordingly, each bus master would be able to determine when its pending transaction is the highest priority transaction and that it could control the bus after the termination of the present transaction.

In yet another alternate embodiment, a bus arbiter, such as arbiter 628, determines priority as described before. The bus masters, however, include the clock generation controller logic formed within to enable the master to get the bus frequency for its transaction. This configuration is beneficial in that the bus master already knows the identity of the slave. Accordingly, it would either dynamically determine an appropriate bus frequency or, alternatively, perform a lookup in a table similar to table 636 of FIG. 6.

Figure 8:
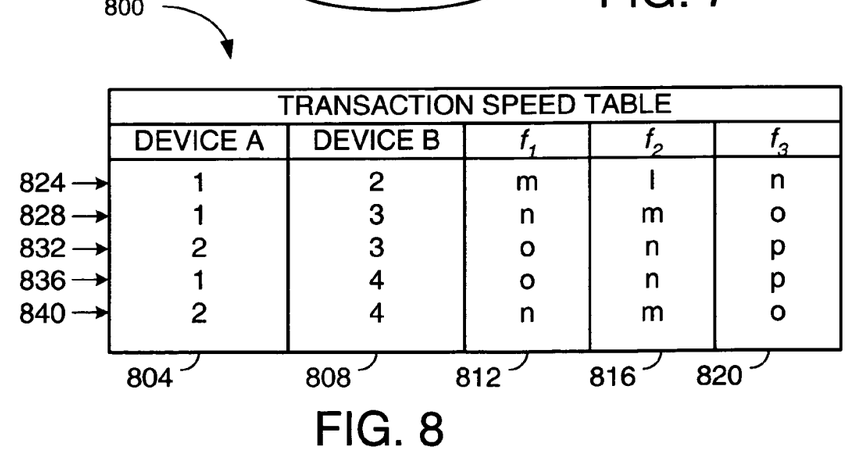
FIG. 8 is a table that illustrates the relationship between the various determinations about the transaction and the frequency.

FIG. 8 is a table that illustrates the relationship between the various determinations about the transaction and the frequency. More specifically, the transactions speed table 800 of FIG. 8 lists a plurality of columns 804, 808, 812, 816, and 820, and a plurality of rows 824, 828, 832, 836, and 840, that are used to identify the appropriate bus frequency or speed. For example, the column shown generally at 804 lists each of the masters to the transaction. Column 808 lists each of the slaves of the transaction. Note that the slave of row 824 is the master of rows 832 and 840. Thus, a master can be a slave for a particular transaction.

Column 812 identifies a corresponding bus speed (frequency) that relates not only to the devices illustrated in the specific row, but also to the type of transaction. Thus, if the master is device 1 and the slave is device 2, as shown in row 824, and if the transaction type is a first type, then the frequency will be the frequency "m", as shown in row 824. Thus, column 812 shows that for a first transaction type, what the frequencies will be according to what the device ID's are for the master and slave devices as indicated in columns 804 and 808. Similarly, for a second and third transaction types, the frequencies are specified in columns 816 and 820 for the various combinations of masters and slaves as identified in columns 804 and 808. In the example of FIG. 8, a character letter that is higher or comes later in the alphabet indicates a higher frequency and a character that comes before another character indicates a lower relative frequency. Accordingly, examining row 824, the lowest frequency for devices 1 and 2 will be for the transaction type that relates to column 816, namely, have a frequency of "1". For a transaction represented by column 812, the frequency will be "m", while for a third transaction type as identified in column 820, the frequency will be the highest of the three, namely, frequency "n".

As may be seen, the frequencies in column 816 are one value lower than each of the frequencies shown in column 812, which in turn are one value lower than the frequencies shown in column 820. The types of transactions are not specifically identified, however, those skilled in the art are aware of the various bus speeds that can be sustained for the various types of transactions. For example, a direct memory access type of transaction may be transmitted at a higher bus frequency than an interactive communication requiring validation. Thus, what FIG. 8 illustrates is that a relationship exists between the transaction type and the identity of the master and slave devices for a particular transaction.

Referring again to FIG. 7, the bus arbiter would examine the contents of table 800 of FIG. 8 as a part of determining the new bus rate in step 720 in one embodiment of the invention. Thereafter, it would determine if the bus rate should be changed based upon the size of the transaction as identified in step 728, and then if it is worth changing, the bus arbiter would wait and change the bus after the termination of the present transaction as specified in step 732.

Another consideration that goes into defining the frequencies specified in columns 812, 816 and 820, is the relative difference in frequency between the terminals, as well as the bus itself. The present algorithms of the invention are simplified if the master clock frequency and the slave clock frequency are both integer multiples of the bus frequency. Thus, for example, if the master operates at 300 MHz while the slave operates at 200 MHz, or alternatively, 100 MHz, the fastest speed that is allowable for the bus without violating the integer multiple rule is 100 MHz. If, for example, the slave has an internal clock speed of 200 MHz, then setting the bus to 200 MHz would result in a scenario in which the state machine within the slave would not necessarily be able to determine when to generate the sample pulses in only one period or clock cycle of the bus.

As has been mentioned before, however, other factors also come into play in determining a bus frequency, such as the length of the transmission over the bus, as well as the capacitance on the bus due to the number of devices that are coupled to it. Thus, even if the speed of the master and slave internal clock rates is one that supports a very high bus rate, these other factors may limit the bus rate. Thus, in our last example, it may be that 100 MHz is still too high of a speed for the bus. If, for example, capacitance, as well as the length of the bus line mandates a speed that is somewhere between 50 and 100 MHz, then a bus speed of 50 MHz is selected to satisfy the integer multiple rule.

Figure 9:
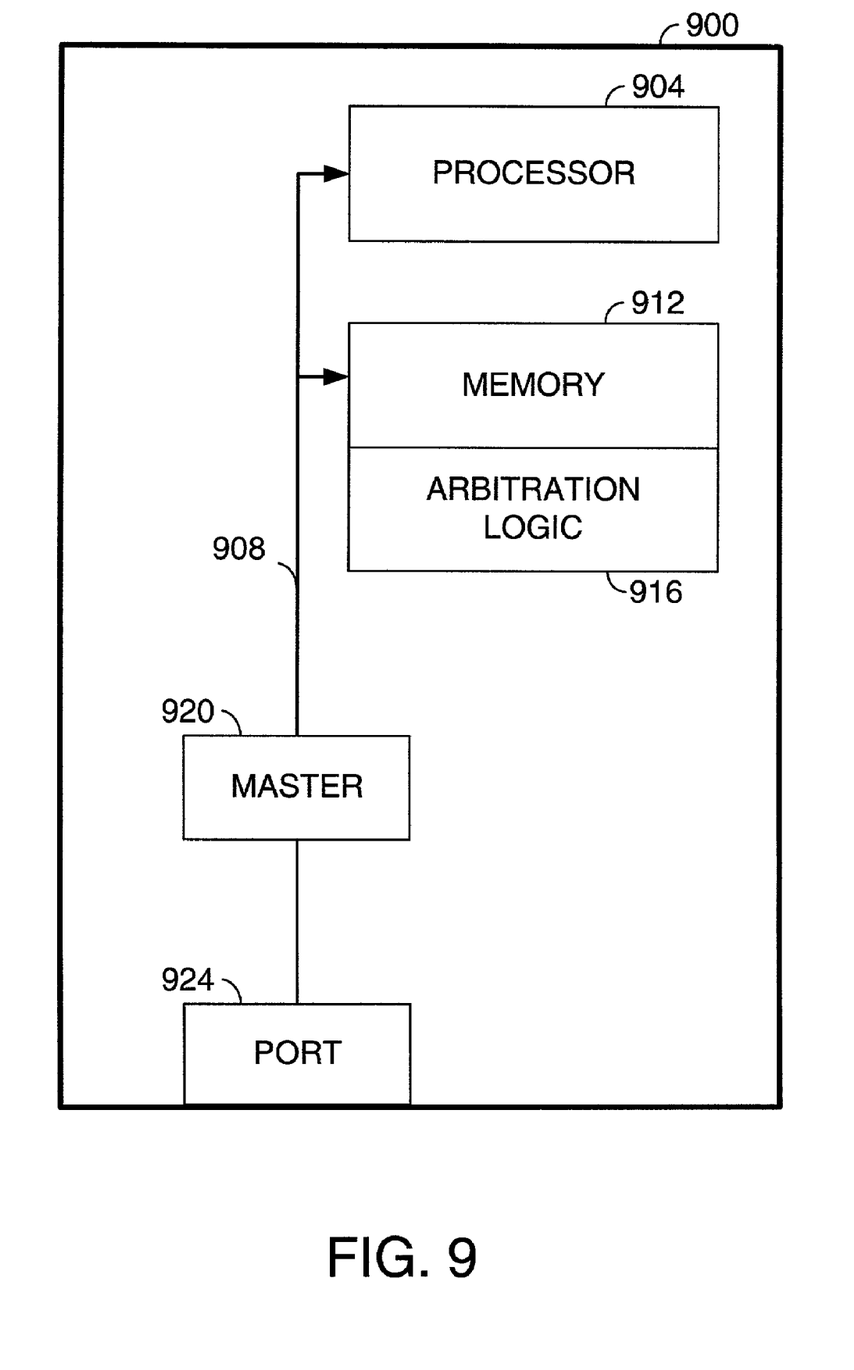
FIG. 9 is a functional block diagram of a bus arbiter formed according to one embodiment of the present invention.

FIG. 9 is a functional block diagram of a bus arbiter formed according to one embodiment of the present invention. A bus arbiter 900 includes a processor 904 that is coupled to an internal bus 908. Additionally, a memory 912 also is coupled to bus 908. Memory 912 further includes a memory portion 916 that includes computer instructions that define the arbitration logic as described here in this application. Bus 908 further is coupled to an internal bus master 920 that, in turn, is coupled to a port 924.

In operation, processor 904 communicates over bus 908 to retrieve computer instructions defined in memory 912 and to execute those computer instructions to cause bus arbiter 900 to operate in a specified manner. Accordingly, memory 912 not only includes computer instructions in memory portion 916 that define the arbitration logic that is created by the execution of the computer instructions by processor 904, but also includes computer instructions that define the ordinary operation of bus arbiter 900. Thus, in executing the instructions stored within arbitration or within memory portion 916, processor 904 communicates with external systems and the external bus shown in FIG. 6 through port 924.

It is through port 924 that bus arbiter 900 receives not only communications over the bus itself, for example, instructions and requests received over bus 620 of FIG. 6, but also the requests for bus resources and the grant response that is transmitted on the dedicated control lines, as is shown in FIG. 6. Port 924 is, for the sake of simplicity, shown to be a generic port but it is understood that it represents each and every port for each and every type of communication of bus arbiter 900.

While FIG. 9 illustrates a processor-based bus arbiter that implements the arbitration logic described herein, it is understood that bus arbiter 900 may also be formed out of any other known technology, including applications-specific integrated circuits (ASICs), field programmable gate arrays (FPGAs), and field programmable gate arrays that include embedded core processors and embedded ASIC circuitry. In one described embodiment, a high-performance implementation of the arbiter includes dedicated hardware logic to perform the table lookup and arbitration tasks. Any type of hardware system that implements the logic described herein by the timing diagrams and by the flowchart may be used in place of the bus arbiter shown in FIG. 9.

The inventive method and apparatus disclosed herein are particularly advantageous in that they provide for bus frequencies to be modified according to a particular transaction. As a result of this dynamic bus frequency assignment scheme, bus throughput is improved.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A bus arbiter coupled to a first and second bus master, a first and second slave and a bus, comprising:
    at least one port coupled to receive bus request commands for a transaction from either the first or second bus master and coupled to receive an address or identity of the first and second slaves for the transaction, and also coupled to communicate over the bus; and
    logic circuitry that defines logic to select a bus frequency according to the requested transaction.

2. The bus arbiter of claim 1 wherein the logic circuitry defines logic to select a bus frequency according to the identity of the slave for the requested transaction.

3. The bus arbiter of claim 1 wherein the logic circuitry defines logic to select a bus frequency according to the identity of the master for the requested transaction.

4. The bus arbiter of claim 1 wherein the logic circuitry defines logic to select a bus frequency according to the length of the bus between the first or second master and the first or second slave according to which ones are involved in the requested transaction.

5. A method for generating sample cycle pulses, comprising:
    determining a ratio of an internal clock of a device to the clock of a bus; and
    generating a sample cycle pulse in an appropriate cycle of the internal clock with respect to the ratio.

6. The method of claim 5 wherein the ratio of clocks is determined by counting the negative or falling edges of the faster clock pulses in two periods of the slower clock and dividing by 2.

7. A method for selecting a bus frequency, comprising:
    setting a bus frequency according to a transaction having a source and a destination
    the bus frequency being such that a device receiving a communication of the transaction will have a frequency that is an integer multiple of the bus frequency.

8. The method of claim 7 further comprising determining the identity of a master bus and its corresponding internal frequency.

9. The method of claim 7 further comprising determining the identity and corresponding internal frequency of a slave or receiver device.

10. The method of claim 7 further comprising determining the identity of the devices in the transaction and examining a table to determine a corresponding bus frequency.

11. The method of claim 7 wherein the bus frequency for the transaction is determined dynamically rather than by performing a table lookup.

12. The method of claim 7 wherein the bus frequency also is set according to an expected or determined amount of impedance in the bus between the terminals that are a part of the transaction.

13. The method of claim 7 wherein the bus frequency is determined by a bus arbiter.

14. The method of claim 7 wherein the bus frequency is determined by a clock generation controller.

15. The method of claim 7 wherein the frequency of the bus is determined by a bus master.

16. A bus slave, comprising:
    at least one input port for receiving communication signals and control signals;
    circuitry for determining a bus frequency;
    circuitry for determining a ratio between an internal clock of the bus slave and the bus frequency; and
    circuitry for determining when to latch a communication signal being received over the at least one input port with respect to the ratio.

17. The bus slave of claim 16 further including a state machine for generating a sample cycle signal, the sample cycle signal prompting the bus slave to latch the communication signals as a part of determining when to latch the communication signal.

18. A system, comprising:
    first and second bus masters;
    first and second slaves;
    a bus coupled to the first and second bus masters and the first and second slaves; and
    a bus arbiter coupled to the bus, the bus arbiter comprising:

at least one port coupled to receive bus request commands for a transaction from either the first or second bus master and coupled to receive an address or identity of the first and second slaves for the transaction, and also coupled to communicate over the bus; and logic circuitry that defines logic to select a bus frequency according to the requested transaction.

19. The system of claim 18, wherein the logic circuitry defines logic to select a bus frequency according to the identity of the slave for the requested transaction.

20. The system of claim 18, wherein the logic circuitry defines logic to select a bus frequency according to the identity of the master for the requested transaction.

21. The system of claim 18, wherein the logic circuitry defines logic to select a bus frequency according to the length of the bus between the first or second master and the first or second slave according to which ones are involved in the requested transaction.

22. The system of claim 18, wherein the bus arbiter is processor-based.

23. The system of claim 18, wherein the bus arbiter comprises one of a group of technologies consisting of: application-specific integrated circuits (ASICs), field programmable gate arrays (FPGAs), and FPGAs that include embedded core processors and embedded ASIC circuitry.

24. The system of claim 23, wherein the bus arbiter includes dedicated hardware logic that performs table lookup and arbitration tasks.

25. The system of claim 18, wherein the first slave comprises:

at least one input port for receiving communication signals and control signals from the bus;

circuitry for determining a bus frequency;

circuitry for determining a ratio between an internal clock of the bus slave and the bus frequency; and circuitry for determining when to latch communication signals being received over the at least one input port.

26. The system of claim 25, wherein:

the circuitry for determining when to latch communication signals includes a state machine; and the state machine generates a sample cycle signal that prompts the slave to latch the communication signals.

* * * * *